June 10, 1969  C. H. HAAKE  3,449,692

LASER MODULATION SYSTEM

Filed Sept. 4, 1963

WITNESSES:
John G. Chopp
James L. Young

INVENTOR
Claus H. Haake
BY
Ernest P. Klipfel
ATTORNEY $3,449,692$
LASER MODULATION SYSTEMS
Claus H. Haake, Altadena, Calif., assignor to Westinghouse Electric Corporation, East Pittsburgh, Pa., a corporation of Pennsylvania
Filed Sept. 4, 1963, Ser. No. 306,515
Int. Cl. H01s *3/10;* G02f *1/30*
U.S. Cl. 331—94.5                       2 Claims

ABSTRACT OF THE DISCLOSURE

A laser modulation system wherein the vibration or displacement of one of the mirrored surfaces, either by distance or angle, is accomplished by a modulation condenser.

---

The present invention relates generally to lasers and more particularly to a laser capable of modulating radiation to transmit information.

In general, the resonant cavity of a laser is of the type of a Fabry-Perot interferometer, that is, the laser material is bordered by two plane-parallel mirrors, one or both of which are slightly transparent for providing an exit for the laser radiation. The adjustment or tuning of the mirrors for parallelity is very critical for obtaining maximum laser action. Solid-state lasers have the mirrors evaporated directly onto the polished end plates of the laser crystals. Machining must be very precise since no adjustments are possible after production. Gas lasers, on the other hand, can easily be adjusted by keeping the planes of the end plates adjustable.

Lasers produce extremely monochromatic radiation of very high power and directivity. The output of a laser is maintained as long as the exciting radiation is sufficiently intense to insure an inverted population of electronic states in the laser material and when maintained is referred to as being of the continuous wave type.

It is highly desirable to vary the output radiation of a laser to thereby transmit information. The present invention provides modulation of signals emitted from lasers; such modulation being controlled by varying the position of one mirrored surface with respect to another mirrored surface in accordance with an input signal.

An object of the present invention is to provide a laser capable of modulating output radiation in accordance with an input signal.

Another object of the present invention is to provide a laser having an output amplitude-modulated by an input signal.

Another object of the present invention is to provide a laser having an output frequency-modulated by an input signal.

Further objects and advantages of the present invention will be readily apparent from the following detailed description taken in conjunction with the drawing, in which.

Figure 1:
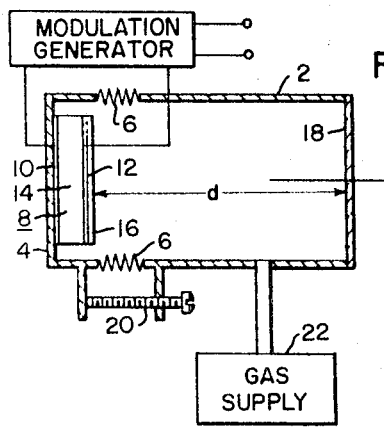
FIGURE 1 is a schematic diagram of an illustrative embodiment of the present invention.

Referring to FIG. 1, a gas laser is illustrated having a resonant structure cavity 2 including an end cover 4 flexibily secured to the remainder of the cavity 2 by means of bellows 6. Mounted within the end cover 4 is a modulation condenser 8 having electrodes 10 and 12 enclosing a piezoelectric crystal 14. An opaque mirror 16 is mounted on the electrode 12. The mirror 16 is mounted to be a predetermined distance, $d$, from the slightly transparent mirror 18 mounted at the opposite end of the cavity 2. A set screw 20 preestablishes the distance $d$ separating the mirrors 16 and 18. A gas supply 22 is schematically shown to provide gas for excitation. The gas is excited by an RF field (not shown) which produces an electrical discharge through the gas. The light field which is built up stimulates coherent emission of selected atom levels which radiate through the slightly transparent mirror 18.

Figure 2:
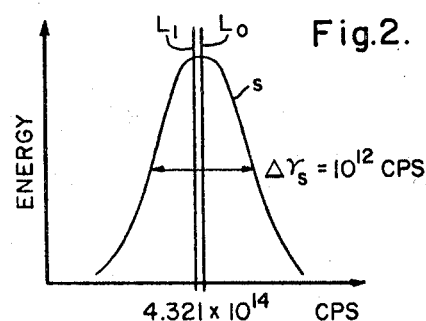
FIG. 2 is a graphical representation illustrating the manner in which my invention obtains the desired results.
Figure 3:
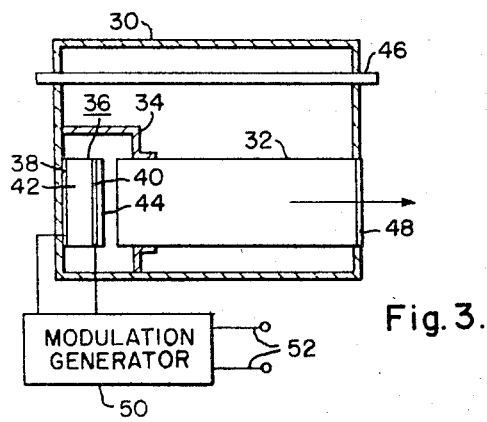
FIG. 3 is a schematic diagram of another illustrative embodiment of the present invention.

For a clearer understanding of the laser construction illustrated in FIG. 1 and FIG. 3 and the manner by which such construction frequency modulates the energy output therefrom, reference is made to FIG. 2.

If the laser emits a narrow band of energy with a center wavelength of $\lambda_0$, the wavelength inside the cavity 2 is $\lambda_0/n$, $n$ being the refractive index of the laser. The distance, $d$, between the plane-parallel mirrors 16 and 18 must be exactly $$d = m\lambda_0/2n$$

where $m = 1, 2, 3 \ldots$. The two neighboring modes along the dimension $d$ have the wavelength $$\lambda_{1,2} = 2dn/(m \pm 1)$$

These modes are, of course, possible only if $\lambda_{1,2}$ are present in the emitted band. This will not be the case if the bandwidth, $\Delta\lambda$, of the laser radiation is very much smaller than $|\lambda_1 - \lambda_2|$, in other words, if $|(\lambda_1 - \lambda_2)/\Delta\lambda| \gg 1$.

The bandwidth of the laser is usually given as a frequency interval $\Delta\nu$ which is in the order of $10^4$ to $10^6$. Thus with $$\Delta\lambda = \frac{c}{\nu_0 - \Delta\nu/2} - \frac{c}{\nu_0 + \Delta\nu/2} \approx C\Delta\nu/\nu_0^2$$

where $\nu_0$ is the center frequency of the laser radiation, one can write the inequality in the form $$\frac{c}{dn\Delta\nu} \gg 1$$

Assuming a typical value for the distance between the mirrors to be 100 centimeters and the refractive index $n$ to be equal to 1, it can be seen with the $\Delta\nu = 10^6$ cycles per second the immediately foregoing expression numerically figures $$300 \gg 1$$

Hence, there is in the direction of the dimension between the mirorrs, $d$, just one possible mode.

If, on the other hand, the distance, $d$, is variable between $d \pm \Delta d$ such that $\Delta d$ is equal to or less than $\lambda_0/2n$, the intensity of the laser radiation has its maximum at $d$, drops to a minimum at $\Delta d = \pm \lambda_0/4n$ and has another maximum at $\Delta d = \pm \lambda_0/2n$. One would, therefore, expect that a vibration of the mirror 16 by $\Delta d$ equal to or less than $\lambda_0/4n$ plane-parallelly to the opposite mirror 18 should result in amplitude modulated (AM) laser radiation. However, this consideration does not take into account that the laser because of the nature of its operation, will adjust its wavelength, $\lambda_0$ in accordance with the available cavity dimensions to produce a standing wave. It can do that because the bandwidth, $\Delta\nu_s$, of the spectrum of the spontaneous emission is always much larger than that, $\Delta\nu$, of the laser radiation. This is illustrated in FIG. 2, for ruby crystal, for example. The spectrum of the spontaneous emission is marked by the curve, $s$. The bandwith $\Delta\nu_s$ is approximately $10^{12}$ cycles per second. The center of the emission band is at $\lambda_0 = 6943$ angstroms which corresponds to $4.321 \times 10^{14}$ cycles per second. Comparatively the spectrum of the laser radiation is a sharp line, L, its bandwidth being less than one millionth of $\Delta \nu_s$. The line $L_0$ corresponds to a mirror distance $d_0$ and the line $L_1$ to, say, $d_0 + \lambda_0/4n$. Since in this range the mode $m$ does not change, one has $$d_0/\lambda_0 = (d_0 + \lambda_0/4n)/\lambda_1$$

Thus with the refractive index $n=1.77$ and the distance between the mirrors $d_0=10$ centimeters one finds $$\lambda_1 = 1.000001 \lambda_0$$

In other words, the frequecny difference of the lines $L_0$ and $L_1$ is about $10^8$ to $10^9$ cycles per second. Because $\Delta \nu_s = 10^{12}$ cycles per second, the lines $L_0$ and $L_1$ are both very nearly in the center of the spectrum of the spontaneous emission. This means that a variation of $d$ by $\lambda_0/4n$ results in a frequency modulation without any noticeable change in amplitude. Although this example is based on the use of a ruby crystal, it can be stated quite generally that extremely small distance variations in the separation between mirrored surfaces will produce broadband frequency modulation (FM) of the laser radiation.

Referring once again to the gas laser of FIG. 1, assuming the piezoelectric crystal 10 to be barium titanium trioxide, $BaTiO_3$, the displacement amplitude $\delta l$, of the right electrode 16 is $\delta l \approx \varphi V$ where $\varphi$ is approximately equal to $2 \times 10^{-8}$ centimeters per volt which is the displacement constant of $BaTiO_3$ and V is the signal voltage applied to the modulation condenser. The wavelength of the laser radiation is $\lambda_0 = 8000$ angstroms. For a $\delta l$ of $\lambda_0/4n$ a signal voltage of about $\pm 500$ volts is needed at the condenser electrodes $(n=1)$.

Referring to FIG. 3, the ruby embodiment characterized in FIG. 2, is illustrated as a solid-state laser having a housing 30 having its internal walls highly polished for reflective purposes. The crystal 32 is positioned within the chamber by a suitable mounting structure 34. The end of the crystal 32 directed outside of the chamber 30 is a mirrored surface which is slightly transparent to allow emission of radiation therethrough. A modulation condenser 36 has outer defined electrodes or walls 38 and 40 containing a piezoelectric crystal 42. An opaque mirror 44 is movably mounted with the right-hand electrode 40. The end of the crystal 32 opposite the opaque mirror 44 is prepared to minimize reflectivity between the mirror 44 and that end of the crystal 32. A light source 46 of suitable type extends through the housing 30 and provides means for exciting atoms within the crystal 32 to a higher energy state. In dropping back to ground state, the selected atoms emit coherent light by the stimulated emission of the laser beam as it is reflected between the mirrors 48 and 44. A modulation generator 50 is connected to provide excitation to the electrodes 38 and 40 in accordance with an input signal received at the input terminals 52. Thus, it can be seen, that an input signal at the terminals 52 will vary the excitation output of the modulation generator 50, thereby causing the modulation condenser 36 to vibrate. Assuming the distance, $d$, between the mirrors 44 and 48 to be selected for emission of a narrow band with a center wavelength of $\lambda_0$, the output of the modulation generator 50 is made sufficiently great to displace the right electrode 40 and hence the opaque mirror 44 by an incremental distance $\Delta d$ equal to or less than $\lambda_0/4n$ wherein $n$ is the refractive index of the crystal 32. The laser signal is thus frequency modulated in the same manner as the operation described for FIG. 1.

It is also possible to change, in accordance with an input signal, the respective angle $\alpha$, between the mirrors of a laser, thereby amplitude modulating the output signal.

Figure 4:
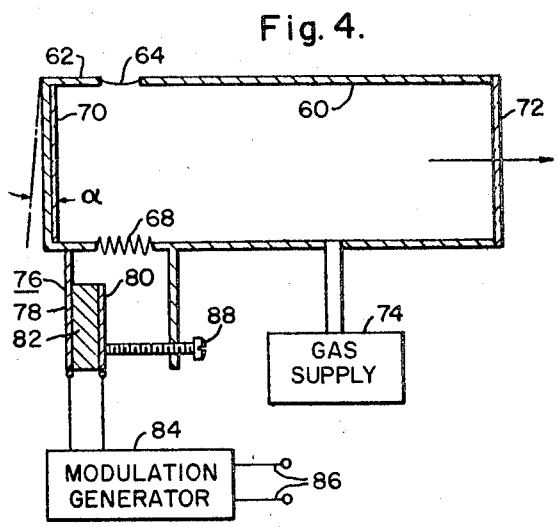
FIG. 4 is a schematic diagram of still another illustrative embodiment of the present invention.

Referring to FIG. 4, the gas laser is illustrated having a cavity 60 including an end cover 62 flexibly secured to the remainder of the cavity 60 by means of the flexible section 64 and bellows 68. Mounted within the end cover 62 is an opaque mirror 70. At the opposite end of the cavity a slightly transparent mirror 72 is located to reflect as well as allow passage of light from the cavity. A gas supply 74 is schematically shown to provide gas for excitation. The gas within the cavity is excited by an RF field (not shown) which produces an electrical discharge through the gas. As is well known in the art, the light field builds up and becomes coherent stimulating coherent emission of selected atom levels.

Figure 5:
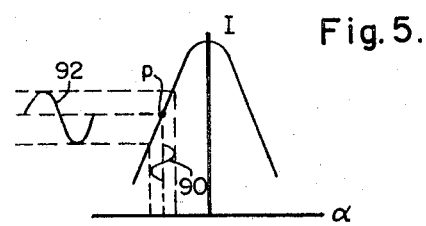
FIG. 5 illustrates the manner in which the embodiment of FIG. 4 obtains the desired results.

A modulation condenser 76 having outer defined walls or electrodes 78 and 80 contains a piezoelectric crystal 82 mounted to be energized by a modulation generator 84 in accordance with an input signal received at terminals 86. The left electrode 78 is fixed to the opaque mirror 70. The right electrode 80 is fixed relative to the laser cavity by the adjustment screw 88 and is considered immobile for a given screw setting. The operating point of the laser is adjusted by the screw 88. The output of the modulation generator 84 causes angular deflections of the opaque miror 70. Thus, the angle $\alpha$ between the two mirrors 70 and 72 can be varied in accordance with the input signal received at the terminals 86. The number of reflections of the wave between the mirrors is, of course, highest if the mirrors are exactly plane-parallel ($\alpha = 0$). Since an efficient operation of the laser depends on the high number of reflections between the mirrors, a slight deviation of the angle $\alpha$ from zero will result in a sharp drop of the intensity of the laser radiation. FIG. 5 illustrates the characteristic curve of such a laser where the intensity I of the laser radiation is plotted versus the detuning angle $\alpha$. By presetting the angle $\alpha$ at a position somewhat less than optimum, an operating point P for zero modulation can be established. The preset operating angle $\alpha$ is determined by the setting of the screw 88. Fairly linear amplification can be obtained by modulating on a side of the carrier. For example, for a given waveform 90 defining the change in angle $\alpha$, the output intensity from the laser will vary as illustrated by the waveform 92.

Figure 6:
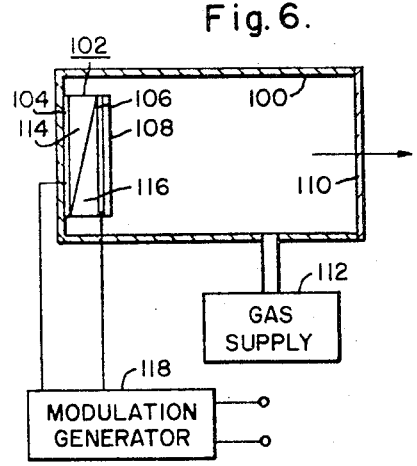
FIG. 6 is a schematic diagram of yet another illustrative embodiment of the present invention.

An alternate embodiment for obtaining amplitude modulation of the output intensity of a laser is as illustrated in FIG. 6. A resonating structure cavity 100 has mounted at one end a modulation condenser 102 secured to the end wall by its outer defined wall or electrode 104. The other electrode 106 of the modulation condenser 102 has an opaque mirror 108 secured thereto and so positioned with respect to the slightly transparent mirror 110 at the opposite end of the cavity to provide an operating point P on the characteristic curve of FIG. 5. Again, a gas supply 112 is schematically shown to provide gas for excitation. An RF field (not shown) produces an electrical discharge and radiation is stimulated in the usual manner. The modulation condenser 102 is constructed to include two different materials disposed in triangular cross section through the entire length of the condenser. The first material 114 may be a fill while the other material 116 exhibits piezoelectric characteristics. A voltage applied to the condenser electrodes 104 and 106 by means of a modulation generator 118 connected thereacross will then produce little displacement at the top of the material 116 and maximum displacement at the bottom of the material 116. If the voltage from the modulation generator 118 alternates, the right condenser electrode or wall 106 will perform angular vibrations as will the opaque mirror 108 secured thereto. Again, the output amplitude will be modulated in accordance with the input signal to the modulation generator 118.

While the present invention has been described with a degree of particularity for the purpose of illustration, it is to be understood that all alterations, modifications and equivalents within the spirit and scope of the present invention are herein meant to be included. For example, for producing the modulating mirror vibrations, any one of the customary means may be chosen such as moving coils in magnetic fields, resistance variations as applied in carbon microphones as well as piezoelectric crystals previously illustrated. When desirable, the input signal may be applied directly to the electrodes of the electromechanical transducer such as the modulation condenser, thereby eliminating the modulation generator.

I claim as my invention:

1. In a laser, the combination comprising; a housing; an active material that will produce stimulated emission of radiation disposed within said housing; one end of said housing being a slightly transparent mirror for passage of radiation therethrough; a modulating condenser having two electrodes mounted within and at the opposite end of said housing, said electrodes separated by two different materials disposed in triangular cross section, the first material being a fill while the other material exhibits piezoelectric characteristics; said modulating condenser having an opaque mirror mounted on one of said electrodes and facing the slightly transparent mirror at said opposite end of said housing; said one of said electrodes angularly deflecting in response to excitation applied to the pair of electrodes across said two different materials; and modulation generator means for providing excitation to said electrodes in response to an input signal.

2. In a laser having amplitude modulated output radiation, the combination comprising; a cavity including an end cover flexibly mounted to move relative to the remainder of said cavity; a mirror mounted within said end cover and another slightly transparent mirror mounted at the opposite end of said cavity; and active material that will produce stimulated emission of radiation disposed within said cavity and positioned between said mirrors; means for pumping said active material; means for presetting the angular displacement between said mirrors; means secured to said end cover responsive to an input signal for varying the angular displacement between said mirrors, said means for varying angular displacement including a modulation condenser including two electrodes, one of which is secured to said end cover; and a modulation generator connected to said condenser for energizing said modulation condenser to vary the angular displacement of said end cover and hence its associated mirror with respect to the mirror at the opposite end of said cavity.

References Cited

UNITED STATES PATENTS

| | | | |
|---|---|---|---|
| 3,252,110 | 5/1966 | Gustafson et al. | 331—94.5 |
| 3,299,368 | 1/1967 | Klebba | 331—94.5 |

RONALD L. WIBERT, *Primary Examiner.*

W. L. SIKES, *Assistant Examiner.*

U.S. Cl. X.R.

350—266, 269, 275